US006289903B1

(12) United States Patent
Haufler

(10) Patent No.: US 6,289,903 B1
(45) Date of Patent: Sep. 18, 2001

(54) ACCESSORY DISPLAY SYSTEM AND METHOD

(76) Inventor: Heidi K. J. Haufler, 20747 Bay Shore Dr., Flint, TX (US) 75762

( * ) Notice: Subject to any disclaimer, the term of this patent is extended or adjusted under 35 U.S.C. 154(b) by 0 days.

(21) Appl. No.: 09/625,087

(22) Filed: Jul. 25, 2000

(51) Int. Cl.$^7$ .............................. A45D 8/12; A01K 27/00; A44C 25/00
(52) U.S. Cl. ......................... 132/275; 119/857; 119/858; 2/209.13; 63/23; 63/40
(58) Field of Search ................................. 132/275; 2/174, 2/209.13, 209.14; 119/856, 857, 858; 63/3, 23, 40, 43

(56) References Cited

U.S. PATENT DOCUMENTS

| D. 41,486 | 6/1911 | Farrell . | |
| 48,677 | 7/1865 | Grant et al. . | |
| D. 63,566 | 12/1923 | Letarte . | |
| D. 67,805 | 7/1925 | Hammond . | |
| D. 228,646 | 10/1973 | Kissin | D30/38 |
| 904,566 | 11/1908 | Schwab . | |
| 974,605 | * 11/1910 | Schofield | 2/209.13 |
| 1,166,629 | 1/1916 | Pratt . | |
| 1,623,768 | * 4/1927 | Williams | 2/209.13 |
| 2,180,726 | 11/1939 | Bradley | 63/1 |
| 2,641,074 | 6/1953 | Richmond | 40/19 |
| 3,701,166 | 10/1972 | Lindblom | 2/244 |
| 3,848,271 | 11/1974 | Goele | 2/338 |
| 4,407,233 | 10/1983 | Bozzacco | 119/106 |
| 4,551,860 | * 11/1985 | Smit et al. | 2/209.13 |
| 4,821,533 | * 4/1989 | Bonnefoy | 63/3 |
| 4,999,747 | 3/1991 | Chen | 362/103 |
| 5,027,992 | 7/1991 | Murray, III | 224/181 |
| 5,154,196 | * 10/1992 | Moffat | 132/275 |
| 5,219,069 | 6/1993 | Sonnek | 206/0.83 |
| 5,325,542 | 7/1994 | Lenerville | 2/244 |
| 5,388,598 | * 2/1995 | Whitten | 132/275 |
| 5,398,705 | 3/1995 | Hiltbrand et al. | 132/275 |
| 5,653,197 | 8/1997 | Massaro et al. | 119/858 |
| 5,737,811 | * 4/1998 | Rashid | 63/43 |
| 5,797,408 | 8/1998 | Wilson | 132/275 |
| 5,829,457 | 11/1998 | Huang | 132/275 |
| 5,893,377 | 4/1999 | Chen | 132/275 |
| 5,898,946 | * 5/1999 | Keating et al. | 2/209.13 |
| 5,901,381 | 5/1999 | Nelson | 2/209.13 |
| 5,934,294 | 8/1999 | Chiang | 132/275 |
| 5,979,466 | 11/1999 | Chung | 132/275 |
| 6,026,515 | 2/2000 | Nielson et al. | 2/244 |

* cited by examiner

Primary Examiner—Todd E. Manahan
(74) Attorney, Agent, or Firm—Baker Botts L.L.P.

(57) ABSTRACT

A method for displaying accessories includes providing a wearable body having a first side and a second side. The method also includes coupling to the wearable body at least one accessory using a cord adapted to be woven through a portion of the wearable body. In another embodiment of the invention, an accessory display holder includes a wearable body and a cord adapted to be woven through at least a portion of the wearable body. The accessory display holder also includes at least one accessory adapted to be releasably coupled to the cord.

17 Claims, 1 Drawing Sheet

ACCESSORY DISPLAY SYSTEM AND METHOD

TECHNICAL FIELD OF THE INVENTION

This invention relates generally to the field of wearable accessories and more particularly to a method and system for displaying accessories.

BACKGROUND OF THE INVENTION

Consumers who typically wear accessories usually use them to create and/or coordinate various appearances. Usually these consumers buy a number of different accessories to effectively and attractively create these various appearances. For example, some accessories may be used for particular occasions, such as formal occasions, or for introducing and/or coordinating one or more colors in an outfit. In some cases, accessories may also be used to display text such as a wearer's name or affiliation with a sports team.

Unfortunately, many conventional methods for displaying accessories have typically been limited in their ability to provide an effective method for coordinating a variety of appearances. Accessories such as headbands and combs may be limited in the types of accessories that the wearer may display. For example, headbands or combs may be manufactured in a variety of colors. Alternatively or in addition, headbands or combs may include an accessory, such as a ribbon or bow, that may not be removed. Moreover, many accessories may be solely designed for functional, rather than accessorizing, purposes. For example, headbands or combs may be designed solely to retain hair, and collars may be designed solely to retain an animal or pet on a leash.

These conventional methods for displaying accessories may be limited in usefulness. Not only may these methods limit the types of accessories that may be displayed, but many of these headbands, combs, and/or collars may also not be worn without the accessories that they have been designed to display. In addition, many of these conventional methods may not permit a wide range of use for each accessory, or permit mixing and matching of a variety of accessories. Further, these methods may also limit the flexibility with which the accessories may be displayed.

SUMMARY OF THE INVENTION

From the foregoing, it may be appreciated that a need has arisen for an accessory display system and method. In accordance with teachings of the present invention, a system and method are provided that substantially reduce or eliminate disadvantages and problems of conventional systems.

One aspect of the invention is an accessory display holder that includes a wearable body and a cord adapted to be woven through at least a portion of the wearable body. The accessory display holder also includes at least one accessory adapted to be releasably coupled to the cord. In a particular embodiment, the accessory display holder also includes a collar adapted to be worn around a neck of a wearer. In another embodiment, the cord may be selected from one of the group consisting of a textile, an elastomeric material and a flexible polymer. In yet another embodiment, the cord may be adapted to be releasably woven through the wearable body. In a another embodiment, the wearable body includes a plurality of receptacles through which the cord is adapted to be woven.

Another aspect of the invention includes a method for displaying accessories that includes providing a wearable body. The method also includes coupling to the wearable body at least one accessory using a cord adapted to be woven through at least a portion of the wearable body. In another embodiment, the method further includes coupling a plurality of cords to the wearable body. In a further embodiment, the wearable body may be selected from the group consisting of a pet collar and a generally C-shaped headband.

The invention provides several technical advantages. Various embodiments of the invention may have none, some, or all of these advantages. For example, the invention may provide the technical advantage of a wearable body that permits the releasable display of a variety of accessories using at least one cord. Such an advantage may allow a variety of wearable bodies to be won with or without displaying accessories, and may allow accessories to be displayed in a variety of orientations. Another technical advantage of the present invention includes a method and system for displaying accessories with a variety of cords as desired. Another technical advantage of the present invention includes a method and system for exchanging the number and variety of accessories as desired. Other technical advantages may be readily ascertainable by those skilled in the art from the following figures, description and claims.

BRIEF DESCRIPTION OF THE DRAWINGS

For a more complete understanding of the present invention and the advantages thereof, reference is now made to the following descriptions taken in conjunction with the accompanying drawings, wherein like reference numerals represent like parts, and in which.

DETAILED DESCRIPTION OF THE INVENTION

Figure 1:
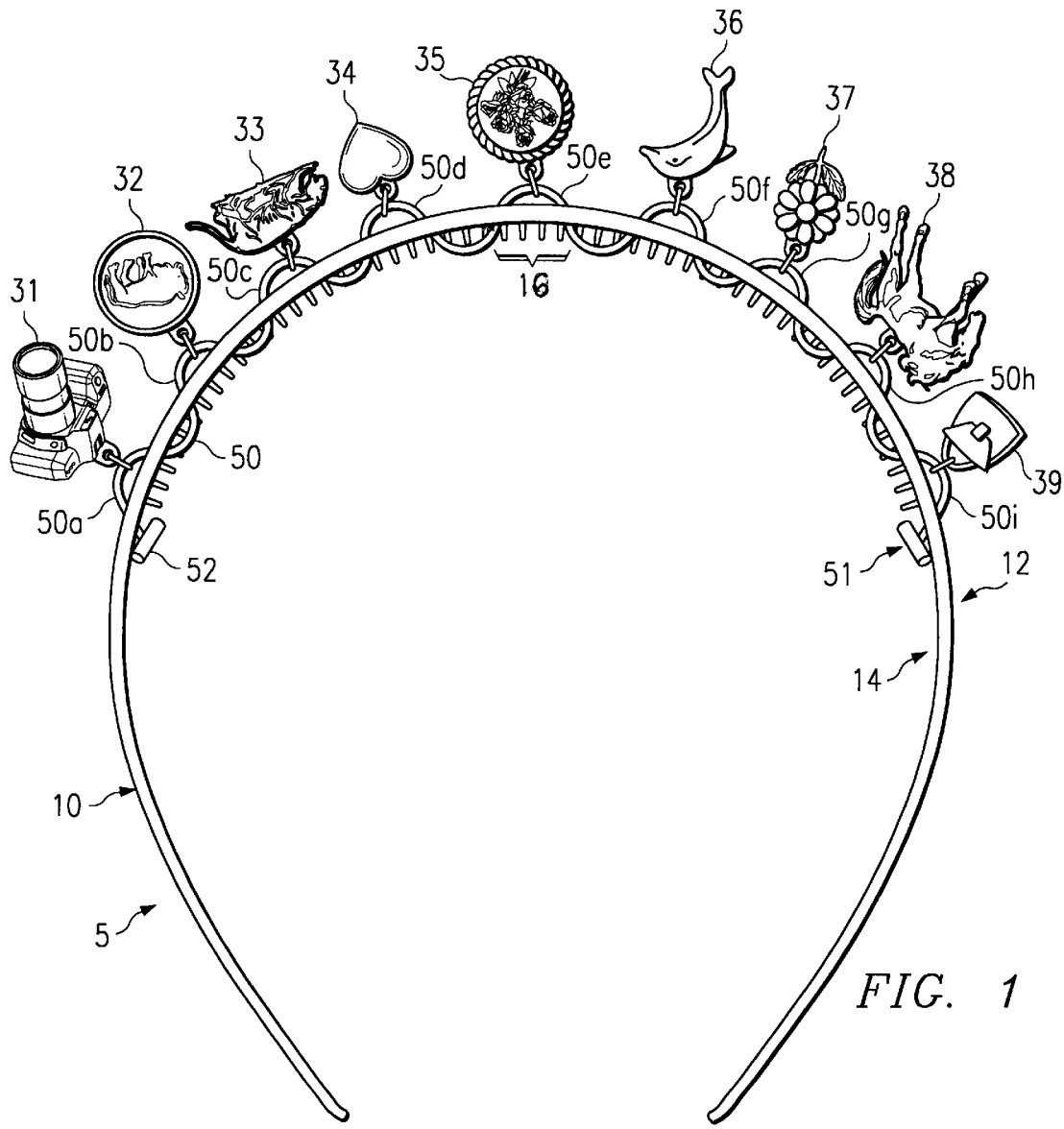
FIG. 1 is a side view of an example of an accessory display system and method utilizing the teachings of the present invention.

FIG. 1 is a side view of an example of an accessory display system and method utilizing the teachings of the present invention. Display system 5 includes a wearable body 10, a cord 50, and charms or accessories 31–39. In this embodiment, wearable body 10 is a generally C-shaped headband adapted to be worn on the head of a wearer. Wearable body 10 may also optionally include a plurality of combs 16 that may be used, among other things, to bind or retain the wearer's hair or to resiliently grip the head or hair of the wearer.

Wearable body 10 includes a first side 12 and a second side 14. Wearable body 10 may be any suitable size and shape to accommodate the head of the wearer and cord 50. Some examples for dimensions that may be used to illustrate various aspects of the invention are discussed in conjunction with FIG. 2. In other embodiments, wearable body 10 may include a plurality of separate comb sections 16. Wearable body 10 may be a material such as a flexible thermoplastic polymer or semi-rigid fabric sufficient to retain a general C-shape and to accommodate cord 50, or any mixture thereof. By example and not by limitation, wearable body 10 may be manufactured using material such as heavy cardboard to provide a shaping or backing portion for a padded, flexible fabric covering.

At least one cord 50 may be coupled to wearable body 10 by a variety of methods. For example, cord 50 is illustrated as being threaded or woven from first side 12 to second side 14 at a plurality of locations 18 on wearable body 10. These locations may be, for example, receptacles, slots, or gaps in the material of wearable body 10 that extend from first side 12 to second side 14. The invention also contemplates coupling of cord 50 to wearable body 10 through, for example, receptacles, slots, or gaps in the material of wearable body 10 through a portion of wearable body 10, or on either of first side 12 or second side 14. Cord 50 may also be coupled to wearable body 10 by threading cord 50 through material, such as a strap or loop, that may be affixed or sewed to wearable body 10.

This threading of cord 50 creates a plurality of loops 50a–50i to display accessories 31–39. Cord 50 may be threaded to create loops 50a–50i of a desired and/or varying size. For example, cord 50 may be tightly threaded through at least a portion of wearable body 10 to tightly secure at least one accessory. Cord 50 may also be loosely threaded so that one or more accessories can move freely in a variety of orientations; for example, charms or accessories 31–39 may dangle and move freely about cord 50. Accessory display system 5 may also include a plurality of cords as desired. Such a plurality of cords may, in some embodiments, provide a more convenient method for displaying and/or changing one or more accessories using wearable body 10.

The invention also contemplates a wide range in the variety of charms or accessories 31–39 that may be displayed. By way of example and not by limitation, charms or accessories 31–39 may also include charms, letters, ornaments, bows, or any other decorative item that may be releasably coupled to cord 50. Each of the charms or accessories 31–39 as illustrated in FIG. 1 may be releasably coupled to cord 50 by threading cord 50 through a loop in the charm. The invention also contemplates a variety of methods to couple charms or accessories 31–39 to cord 50, including using clasps or other methods on charms or accessories 31–39, threading cord 50 through slots or other receptacles on charms or accessories 31–39, tying cord 50 to charms or accessories 31–39 using knots, and a variety of other methods, depending on the charms or accessories 31–39 and cord 50.

Figure 2:
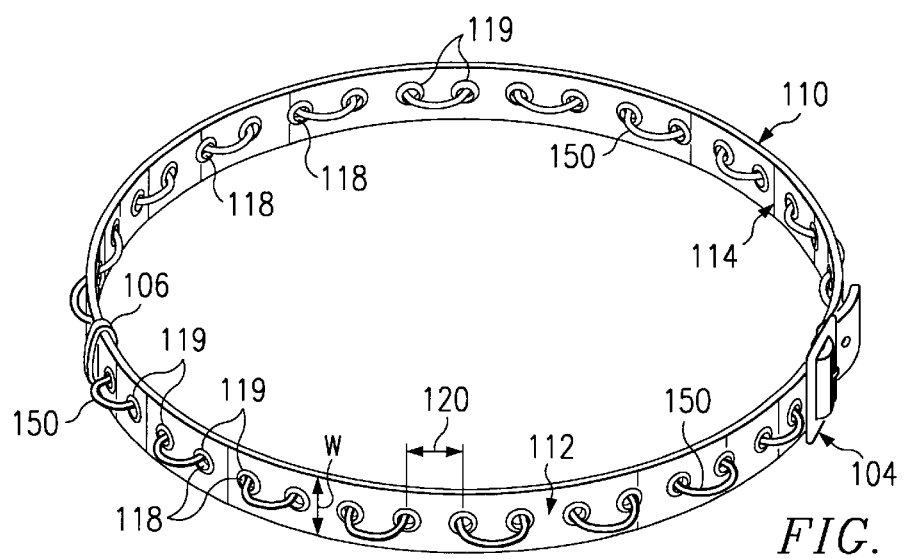
FIG. 2 is a perspective view of an example of an accessory display system and method utilizing the teachings of the present invention.

Cord 50 may also be manufactured using a variety of materials and in a variety of colors. For example, in some applications it may be desirable for cord 50 to be manufactured as an elastic cord that may be threaded through wearable body 10, or receptacles 118 in wearable body 110 as illustrated in FIG. 2. In such an embodiment, cord 50 may also include end pieces 51 and 52. End pieces 51 and 52 may be manufactured using a variety of methods, including crimping a semi-rigid material such as metal or plastic to the elastic cord. End pieces 51 and 52 may form an angle off axis of cord 50, and may be threaded through and used to releasably secure cord 50 to wearable body 10. Cord 50 may also be manufactured using a variety of other elastic and non-elastic material including, but not limited to, fabrics such as ribbon, string, and a variety of textiles and/or flexible plastics that may be woven through wearable body 10. Cord 50 may be secured, releasably or otherwise, to wearable body 10 using a variety of methods including, but not limited to, one or more knots and glue.

FIG. 2 is a perspective view of an example of an accessory display system and method utilizing the teachings of the present invention. In this embodiment, wearable body 110 is a collar having a width W adapted to be worn on the neck of a wearer. For example, wearable body 110 may be a collar that may be worn around the neck by a pet such as a cat or dog.

Wearable body 110 includes a plurality of receptacles 118 between a first side 112 and a second side 114 through which a cord 150 may be woven. Cord 150 may be manufactured using a variety of materials and woven through receptacles 118 and secured, releasably or otherwise, to wearable body 110, as discussed in conjunction with cord 50 of FIG. 1. The plurality of receptacles 118 may be spaced and shaped as desired. By example and not by limitation, receptacles 118 may be circular or irregularly shaped. Alternatively or in addition, receptacles 118 may also be reinforced using, for example, grommets 119. Receptacles 118 may be spaced at any desirable spacing 120. Larger spacings 120 may permit a plurality of accessories to be coupled to cord 150 between any two receptacles 118. Larger spacings 120 may also permit accessories that may be coupled to cord 150 to move more freely than with receptacles spaced at smaller spacings 120. As one example, it may be desirable for receptacles 118 to be spaced approximately one-quarter inch apart.

In addition, the size of each receptacle 118 may change to suit the size and/or width W of wearable body 110. Such spacings 120 may also accommodate various sizes of wearers. By example and not by limitation, for larger wearers such as adults, receptacles 118 may include a diameter of approximately 7/64th of an inch, and for smaller wearers such as children, the diameter may be approximately 3/32nds of an inch. The number of receptacles 118 may also vary as desired. For example, a wearable body 110 for a larger wearer may include eighteen receptacles 118, and for a smaller wearer, fourteen. In such an embodiment, at least nine accessories may be worn by the large wearer, and at least seven accessories may be worn by the smaller wearer.

Wearable body 110 may be manufactured from a variety of materials and may be shaped as desired to be worn around the neck of a wearer. By example and not by limitation, wearer body 110 may be generally C-shaped and manufactured using a flexible thermoplastic polymer. Also by example and not by limitation, wearable body 110 may be generally O-shaped or flat and manufactured from elastomeric material to fit over the wearer's head. Again by example and not by limitation, wearable body 110 may also include a fastener 104 and loop 106. Fastener 104 may be any buckle suitable to adjust wearable body 110 to the neck size of the wearer. It is also within the scope of the invention for wearable body 110 to include other fasteners 104 such as, but not limited to, VELCRO™.

Although receptacles 118 are illustrated generally located in the center of width W of wearable body 110, it is also within the scope of the invention for receptacles 118 to be placed off-center, whether staggered or in a line.

Second side 114 may be manufactured from a variety of materials that may promote comfort for the wearer. For example, second side 114 may include cloth, leather, or terrycloth. Wearable body 110 may also be manufactured from a variety of materials including flexible nylon or thermoplastic polymer material, elastic, and/or a variety of flexible fabrics that are suitable for supporting receptacles 118.

Thus, it is apparent that there has been provided in accordance with the present invention, an accessory display system and method that satisfies the advantages set forth above. While the invention has been particularly shown by the foregoing detailed description, various changes, substitutions, and alterations may be readily ascertainable by those skilled in the art and may be made herein without departing from the spirit and scope of the present invention as defined by the following claims.

What is claimed is:

1. A charm display holder, comprising:
   a wearable body having a first side and a second side and a plurality of receptacles penetrating said wearable body;
   a cord threaded through said receptacles and woven between the first side and the second side of the wearable body;
   an end piece at each end of said cord, one of said end pieces releasably securing the cord to the wearable body; and
   at lease one charm coupled by the cord to the wearable body.

2. The holder of claim 1, wherein the wearable body comprises one of the group consisting of a generally C-shaped headband and a collar.

3. The holder as in claim 1, wherein one of said end pieces comprises a crimped semi-rigid material.

4. The holder of claim 1, wherein the cord is selected from one of the group consisting of a textile, an elastomeric material and a flexible polymer.

5. The holder of claim 1, wherein the wearable body is selected from one of the group consisting of a textile, an elastomeric material and a thermoplastic polymer.

6. The holder of claim 1, further comprising at least one additional charm coupled to the wearable body by at least one additional cord woven through a part of the wearable body.

7. An accessory display holder, comprising:
   a wearable body having a first side and a second side and a plurality of receptacles completely penetrating said wearable body;
   a cord woven through the receptacles;
   an end piece at each end of said cord, one of said end pieces releasably securing the cord to the wearable body; and
   at least one accessory releasably coupled by the cord to the wearable body.

8. The holder as in claim 7, wherein one of said end pieces comprises a crimped semi-rigid material.

9. The holder of claim 7, wherein the wearable body comprises a generally C-shaped headband.

10. The holder of claim 7, wherein the wearable body comprises a collar adapted to be worn around a neck of a wearer.

11. The holder of claim 7, wherein the cord is selected from one of the group consisting of a textile, an elastomeric material and a flexible polymer.

12. A method for displaying accessories, comprising:
    providing a wearable body having a plurality of receptacles penetrating said wearable body; and
    coupling to the wearable body at least one accessory using a cord releaseably woven through said receptacles.

13. The method of claim 12, further comprising selecting the wearable body from the group consisting of a textile, an elastomeric material and a thermoplastic polymer.

14. The method of claim 12, further comprising selecting the cord from the group consisting of a textile, and an elastomeric material.

15. The method of claim 12, wherein the wearable body is selected from the group consisting of a collar and a generally C-shaped headband.

16. The method of claim 12, further comprising coupling a plurality of cords to the wearable body.

17. The method as in claim 12, wherein the cord has an end piece comprising a crimped semi-rigid material at one end of said cord, said end piece releasably securing the cord to the wearable body.

* * * * *